United States Patent

[11] 3,608,722

[72] Inventor Marcel Picard
Rue Pasteur, Saint-Aigulin, Charente Maritime, France
[21] Appl. No. 792,696
[22] Filed Jan. 21, 1969
[45] Patented Sept. 28, 1971
[32] Priority Jan. 22, 1968
[33] France
[31] 137,139

[54] FILTER HAVING AUTOMATIC MEANS ACTUATED BY DIFFERENTIAL PRESSURE, WHICH MEANS ARE EASILY ACCESSIBLE
4 Claims, 9 Drawing Figs.

[52] U.S. Cl. ................................................. 210/108, 210/333
[51] Int. Cl. ....................................................... B01d 29/38
[50] Field of Search ........................................... 210/107, 108, 332, 333, 112

[56] References Cited
UNITED STATES PATENTS

| | | | |
|---|---|---|---|
| 2,366,112 | 12/1944 | Jokel | 210/108 X |
| 2,434,427 | 1/1948 | Muller | 210/108 UX |
| 3,283,903 | 1/1966 | Muller | 210/108 |
| 3,388,799 | 6/1968 | Rymer | 210/108 X |
| 3,397,784 | 8/1968 | Carr | 210/108 |

*Primary Examiner*—John Adee
*Attorney*—Holcombe, Wetherill & Brisebois

ABSTRACT: Filter comprising a plurality of filtering elements and having a self-cleaning device consisting of a differential piston cooperating with a pivotally mounted cylindrical body, said piston controlling a distributing spigot whereby to insure the cleaning of one filtering element in turn among said multiple filtering elements when moving in one direction and the pivoting of said cylindrical body upon its return in the other direction.

PATENTED SEP 28 1971

INVENTOR
MARCEL PICARD
BY Holcombe, Wetherill & Brisebois
ATTORNEYS

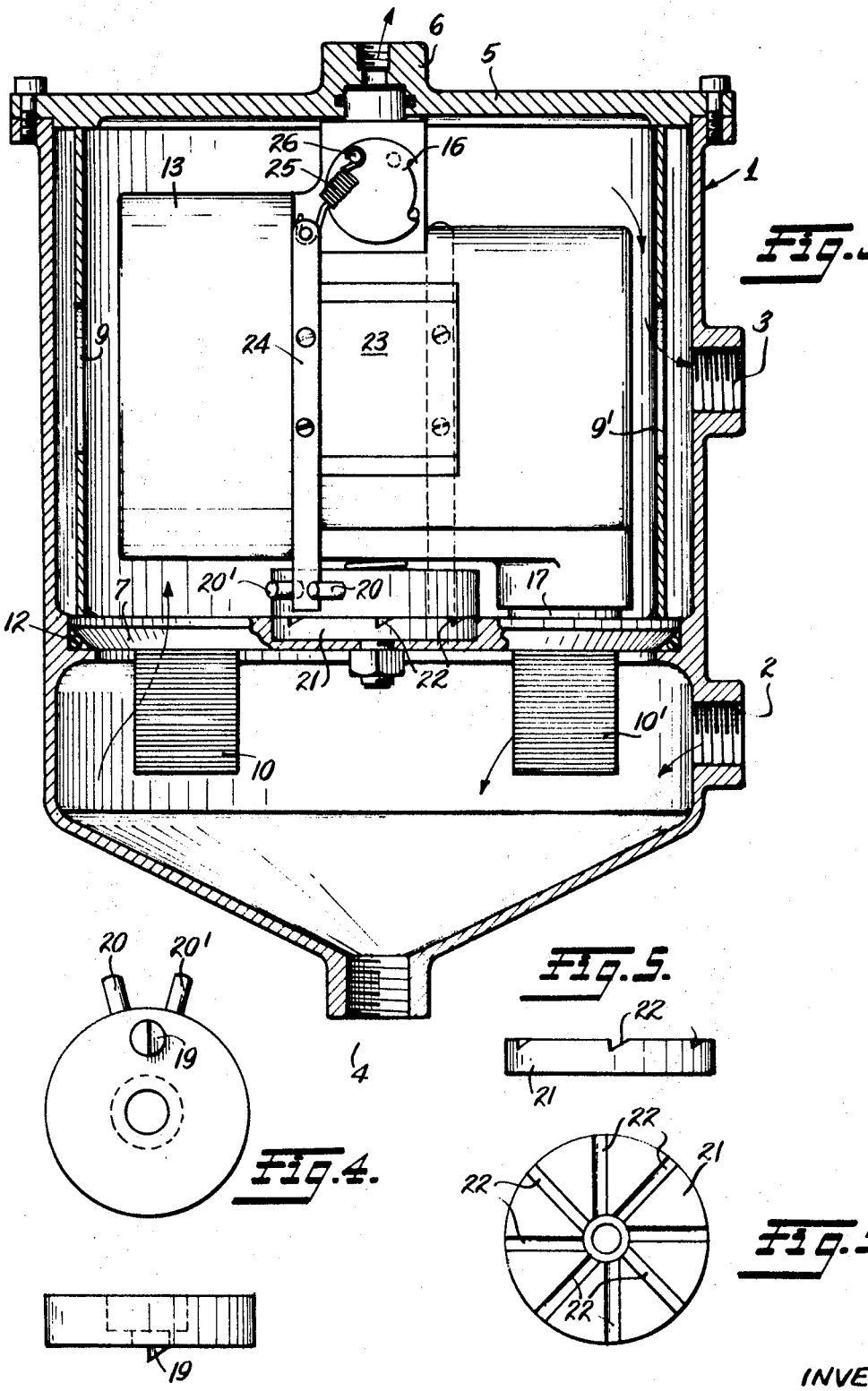

PATENTED SEP 28 1971 3,608,722

INVENTOR
MARCEL PICARD
BY Holcombe, Wetherill & Brisebois
ATTORNEYS

FILTER HAVING AUTOMATIC MEANS ACTUATED BY DIFFERENTIAL PRESSURE, WHICH MEANS ARE EASILY ACCESSIBLE

SUMMARY OF THE INVENTION

In normal use, the filters comprising filtering elements, constituted either by filtering columns or by elements having any other shape, become plugged, which necessitates a frequent dismounting and cleaning of the filtering elements.

The present invention has for its object to provide a filter comprising a device insuring the permanent cleaning of the filtering column members, or any other filtering elements, by countercurrent, acting upon a filtering element, while the other elements insure the output of the filter. The countercurrent is generated by a differential reciprocating piston. The movement of the piston creates the overpressure necessary for the cleaning of the element actuates the inverting valve of the stream of fluid and causes the step-by-step rotation of the overpressure block.

As soon as an inside pressure builds up when the filter is put in service, the device begins to operate and insures the cleaning of the filtering element members.

A paramount advantage of this device resides in the disposition of the constituent elements, which makes it easy to entirely disassemble the filter without any action, whatever may be, on the chief connections. In case of failure of the overpressure block, the latter can be removed very quickly and, then, after resetting the lid, the filter can be put again in service without the recited block.

An illustrative and by no means limitative embodiment of the present invention is described below, with reference to the annexed drawings, in which:

FIG. 3 is a partial sectional view representing the inverting and rotating device for the overpressure block;

FIG. 4 is a bottom plan view of the driving pawl;

FIG. 4A is an elevational view of the driving pawl of FIG. 4;

FIG. 5 is an elevational view of the drive plate;

FIG. 5A is a plan view of the driving plate of FIG. 5;

Figure 1:
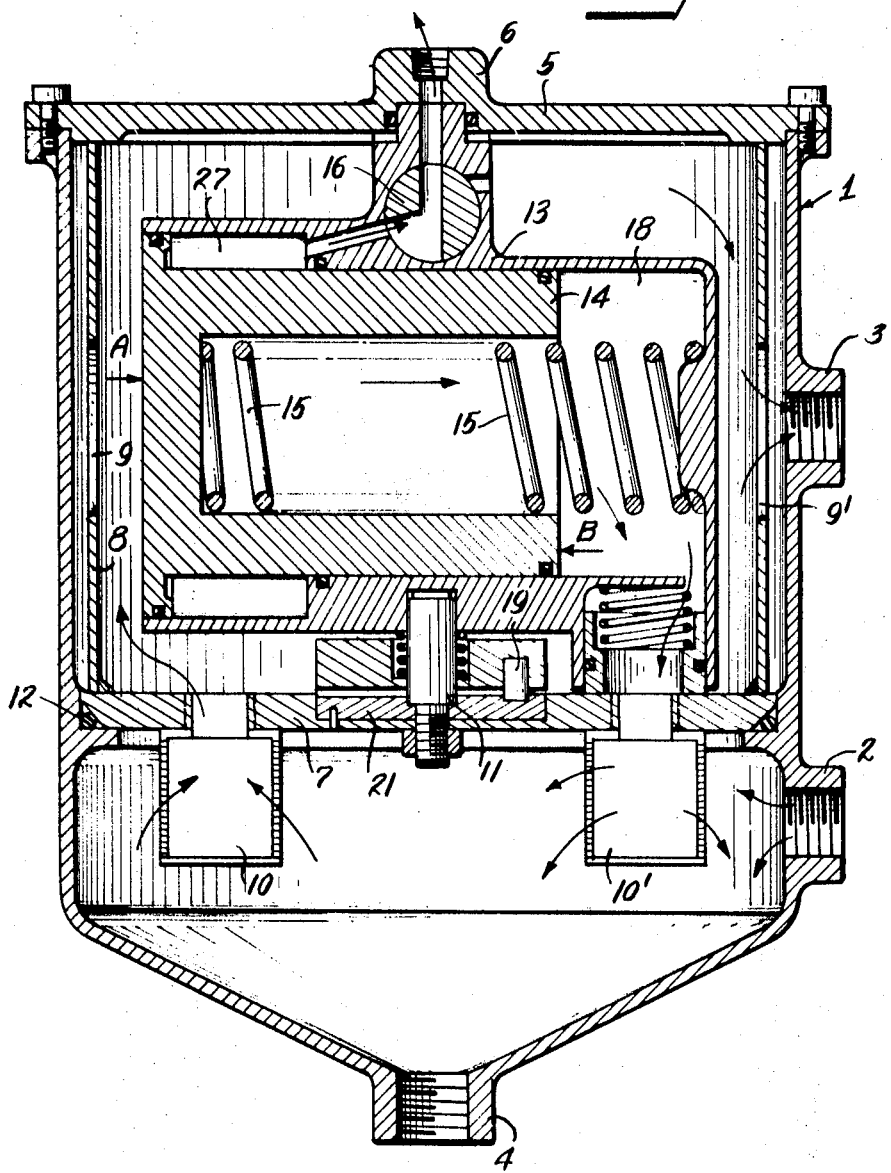
FIG. 1 is a longitudinal sectional view of the whole device, with the differential piston shown at the end of its return stroke.

The filter is constituted by three distinct parts (FIG. 1).

The first part comprises a casing 1 having a pipe 2 for the admission of the impure liquid, a pipe 3 for the outlet of the pure liquid, and a conical bottom provided with a pipe 4 adapted to receive a plug or a spigot, whereby to discharge the residuals which will have settled at the bottom of said cone. Said casing comprises at the top thereof a tight lid 5 fixed by screws and including a boss 6 adapted to receive a cock for regulating the return flow, and a bore receiving the higher pivot of the overpressure device.

Figure 6:
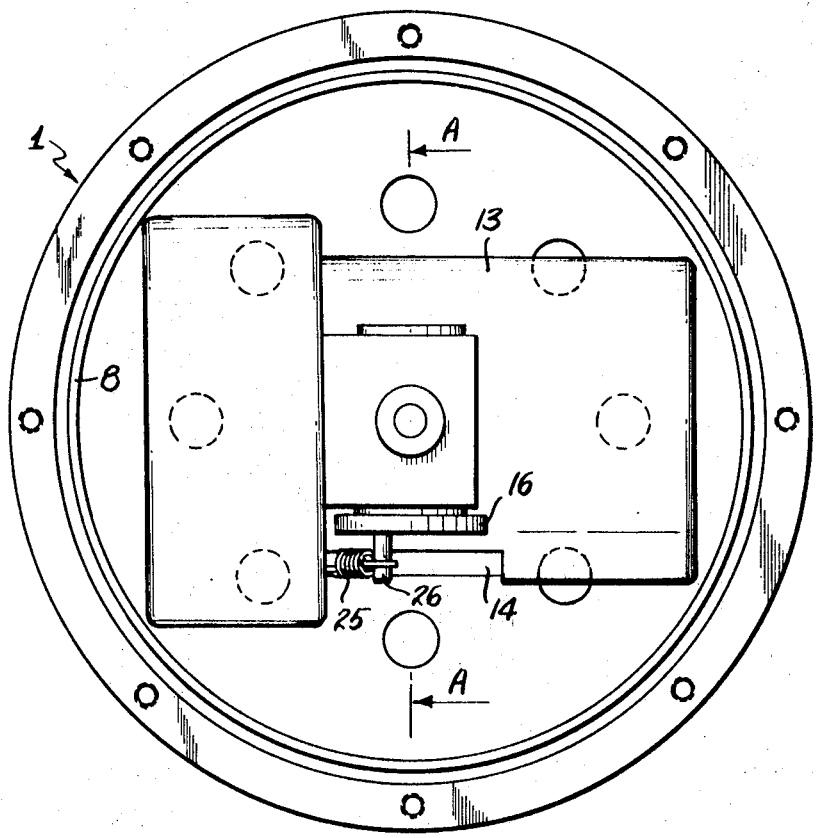
FIG. 6 is a top plan view of the filter, with the lid removed.
Figure 7:
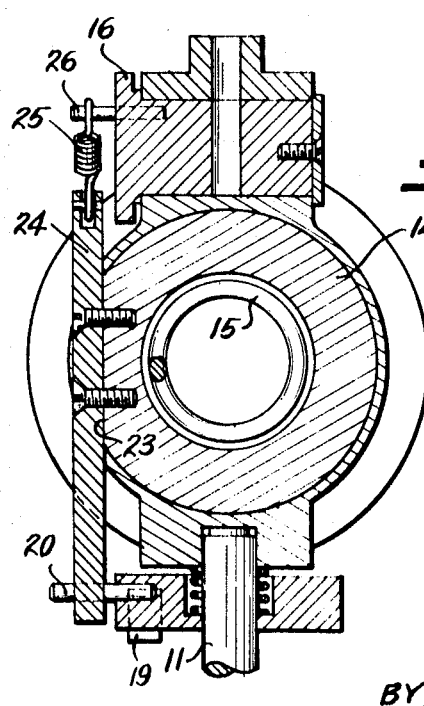
FIG. 7 is a sectional view made along the line A—A, and which shown clearly the inverting device and the control of the step-by-step rotation.

The second part comprises the filtering block which constitutes an assembly including a plate 7 on which is welded a cylinder made from a rolled sheet metal 8 which comprises two holes 9 and 9' which are diametrically opposed, these holes having a double function, namely they insure the communication with the outlet pipe 3 and they insure also an easy grip to remove the filtering block during the dismounting. Said plate 7 has holes therein disposed in a circle (FIG. 6) and which register with filtering elements 10 and 10' fixed at the underface of the plate. Their disposition and number may vary according to the desired output flow. The columns or filtering elements may have any structure, so long as they present the advantage of being cleanable by countercurrent. Preferably, the filtering columns will be constituted by double-spiral yarns rolled around a tube or spider constituting a support. At the center of the plate, will be fixed the pivot 11 supporting the notched plate 21. The separation between the pure fluid and the impure fluid is insured by the gasket 12 which is compressed when the cover 5 is tight. When the filtering block thus constituted is compressed in the casing by the lid, the result a normal filter, which is easily dismountable and cleanable without disturbing the inlet and outlet connections.

Figure 2:
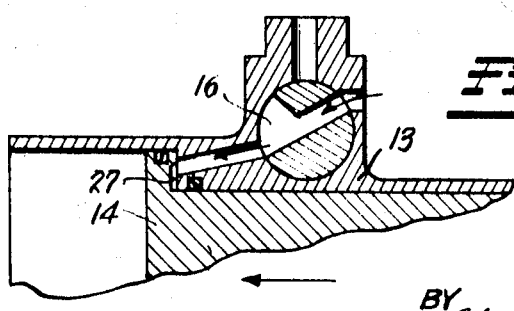
FIG. 2 is a sectional view of the differential piston and of the inverting valve, shown at the end of the stroke generating the overpressure.

The third part comprises the self-cleaning device for the filtering element members. Said device comprises a body in which two bores having different diameters are formed and in which is mounted a differential piston 14, and a spring 15 insuring the return of the piston. A distributing spigot or head 16, constituting the inverting member, is housed at the upper part of the casing (FIG. 1 and FIG. 2). While a spring-biased pad 17 insures a good seal between the plate and the pressure chamber 18 containing the liquid for cleaning the corresponding columns, by countercurrent. The pawl member 19 (FIG. 4), biased by the spring, engages the notches 22 (FIG. 5) in the notched plate 21, the number of these notches 22 corresponding to that of the filtering elements circularly disposed under the plate.

An undercut portion 23 is provided in the body 13 (FIG. 3) and said undercut portion exposes the piston on which a rod 24 is secured, which is integral with said piston in its reciprocating movements. At the upper end of this rod is a spring, the other end of which pivots on the axis of the spigot 16, and causes a sudden inversion of the spigot 16 at every reciprocating movement. The lower part of rod member 24 is engaged between the two driving pins 20 and 20', whereby at each stroke of the piston the pawl is rotated through an angle which is dependent on the number of filter elements disposed under the plate, said notched plate being integral with plate 7. The over pressure block biased at each alternative motion of the piston is moved along said turn portion allowing pad 17 to communicate at each pulse with the hole corresponding with a filtering element at the moment at which the liquid, urged by the piston, creates a countercurrent in said element. The automatic cleaning of the filtering elements one by one takes place as follows:

The filter being connected to a pipe by the inlet pipe 2 thereof and the outlet pipe 3 for pure fluid, a cock is placed at the boss 6 on the lid 5. The cock is connected to a pipe leading to the tank containing the purified liquid, the function of said cock consisting in regulating the frequency of the pulses. An inside pressure builds up when the filter is operating. The filter (FIGS. 1 and 6) comprises eight filtering elements of which seven are actively filtering at any given tie, while the eighth one is in communication with the chamber 18. The reciprocating movement of the piston 14 is effected in the following manner. Piston 14 (FIG. 1) is at this moment at the end of its stroke, the chamber 27 communicates with the open air through the inverting element 16 biased by the spring 25. The differential piston receives a higher pressure on its face A, this face being larger than the face B, and compresses spring 15. The liquid contained in the chamber 18, being compressed at the higher pressure existing in the casing, is forced through the filtering element, and the particles on the outside of the filtering element 10' are detached by the countercurrent thus generated. The particles fall then by gravity to the base of the conical bottom from which they are evacuated. During its stroke, the rod 24 integral with the piston drives the pawl 19 through the pins 20, 20', and the pawl engages again a notch 22 in the fixed plate. 21. The other end of the rod biasing the spring 25 near the end of the stroke acts suddenly on the inverting spigot 16 which turns sufficiently to allow communication of the chamber 27 with the inside pressure of the filter (FIG. 2). The piston is thus balanced, the pressure acting equally on both sides thereof, the spring 15 being compressed and the latter, on account of its expansion pushes the piston in the other direction. The rod 24 drives then the overpressure block, the pawl 19 blocking the rotation of pins 20 and 20'. During this stroke, the chamber 18 fills up with the purified liquid from the column 10' and the next one. Near the end of its stroke, rod 24 drives suddenly the spigot 16 by the intermediary of the spring 25, which communicates the chamber 27 with the atmospheric pressure, the piston 14 is moved again in the other direction, and so on. The cock, which may be placed at the orifice 6 of the lid boss, is adapted to adjust the flow of the liquid from the chamber 27, whereby the frequency of the pulses of piston 14 can be adjusted. The continuous pulses allow thus a permanent cleaning of the elements.

All the moving parts operate in the purified liquid, which insures the advantage of avoiding the premature wearing of the same. The liquid rejected by the returning element 6 is also purified, which offers the advantage of returning pure liquid into the clean tank.

It must be understood that the present invention is not limited to the embodiment described and shown which constitutes an assembly of which many modifications may be made without going outside of the spirit of the present invention.

The number of columns or elements is determined according to the output of the filter.

The filtering elements or columns may be disposed in a star-like fashion, receiving thus at the end of the overpressure piston the liquid generating a countercurrent. A circular filter element may be provided and disposed around the overpressure block and cleaned section by section at each pulse of the piston.

Any other method of filtration may be used and adapted instead of the columns or filtering elements. A single screen rolled on a support divided by several partitions would permit operation under the above-mentioned conditions.

Any other system can be used to replace the inverting plug or spigot 16 so long as it can serve the same function.

I claim:

1. In a filter comprising a cylindrical casing encircling a vertical axis, a plurality of filter elements equally spaced about said axis within said casing, and pressure-responsive means actuated by the pressure of fluid being filtered to successively and cyclically clean said filter elements by forcing countercurrent fluid therethrough, the improvement according to which said pressure-responsive means comprises:

a piston mounted to reciprocate horizontally between two positions inside a cylinder mounted to rotate within said casing in a horizontal plane above said filter members, the portion of said casing between said cylinder and the top of the casing being free of internal obstructions to upward removal of said cylinder and filter members from said casing, means for reciprocating said piston including resilient means biasing said piston toward one position and a distributor head actuated by said piston for movement between a first position subjecting at least part of one side of said piston to atmospheric pressure and a second position subjecting said at least one part to the pressure inside said casing, and a pressure chamber carried by said cylinder, the pressure in which is increased above atmospheric pressure by movement of said piston to one of said two piston positions, the lower end of said pressure chamber terminating in annular sealing means which is brought into alignment with the periphery of each of said filter elements successively as said cylindrical member rotates, whereby fluid from said pressure chamber is forced through each of said filter elements in succession to clean said filter elements.

2. A device as claimed in claim 1 in which said cylinder is rotated by said piston as said piston moves from the position in which it increases the pressure in said pressure chamber toward the other of its two positions.

3. A device as claimed in claim 2 comprising a rod fixed to said piston, one end of which rod is connected to reverse the position of said distributor head during each stroke of said piston, and ratchet means actuated by the other end of said rod to rotate said cylinder from a position in which the lower end of said pressure chamber is in alignment with one of said filter elements to a position in which said pressure chamber is in alignment with the next filter element during each stroke of the piston in one direction.

4. A device as claimed in claim 1 in which said piston is a differential piston comprising sections which differ in diameter, with said at least part of one side of said piston extending between said two sections and defining, with the inner wall of said cylinder and the outer wall of the smaller of said piston sections, a differential pressure chamber in communication with said distributor head.